Oct. 7, 1930.　　　D. M. DEARING　　　1,777,463
SEAT SPRING
Filed Feb. 6, 1929
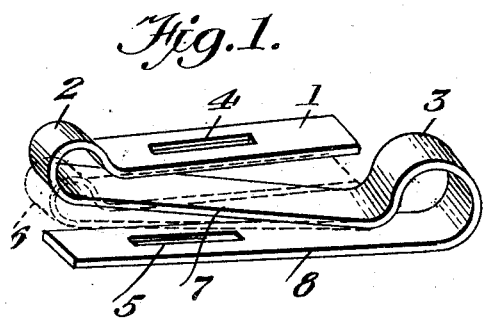
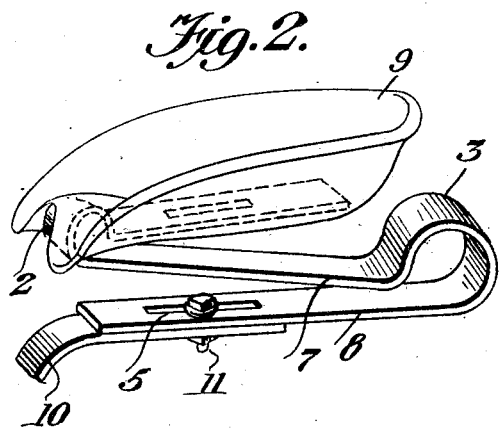
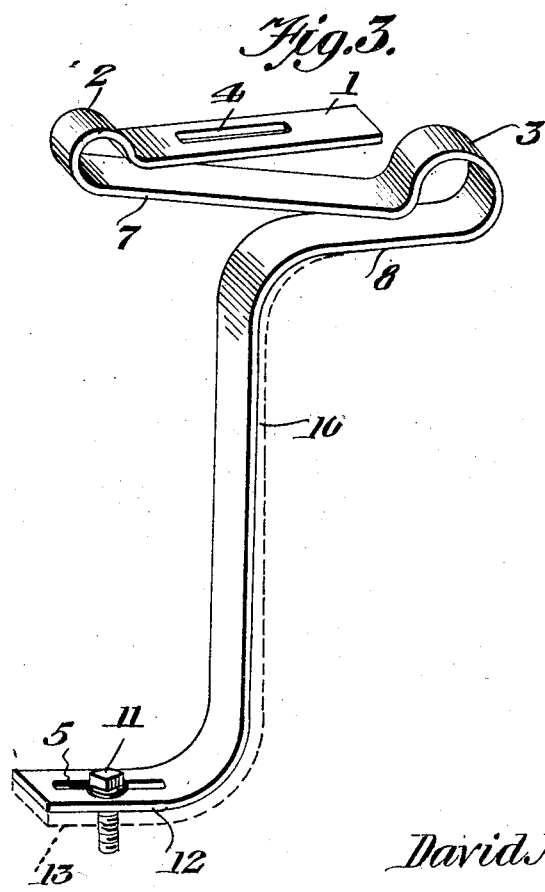
David M. Dearing
INVENTOR
BY Victor J. Evans
ATTORNEY Patented Oct. 7, 1930

1,777,463

UNITED STATES PATENT OFFICE

DAVID M. DEARING, OF PARMA, MICHIGAN, ASSIGNOR TO VAN PERRINE DEARING, OF PARMA, MICHIGAN

SEAT SPRING

Application filed February 6, 1929. Serial No. 337,898.

My invention relates to improvements in seat springs and of efficient and useful improvements thereon especially adapted and designed for general and interchangeable use on all agricultural implements such as tractors, plows, cultivators, mowers or reapers, etc., as a compensating shock absorbing seat spring so as to fit them all.

The invention has for its object among other things, to interpose between the stiff flat risers on tractors and all farm riding tools or machines and the seat of the riders thereon an intermediate absorber of shocks, in the simplest, most durable and efficient form of a one piece seat spring embodying the maximum of vertical action and resiliency, to relieve the rider of the jar and pound of obstructions and uneven ground, which their machines of necessity encounter.

A further object is to provide in a one-piece seat spring construction means of adjustment to carry riders of various weights which heretofore has required a two-piece spring construction which lessened the limited space of activity, efficiency and added to the cost of manufacture.

A further object of which is to provide in a one piece spring of such form as to be readily accessible in adjusting and attaching to all varieties of riding tool risers, a universal type of seat spring interchangeable from one machine to adjust to and fit them all. The invention, therefore, consists primarily, as shown in the construction of my improved seat spring in obtaining and combining the above specified useful and highly efficient and requisite features in the formation of one piece spring steel into a seat as illustrated by the accompanying drawings, set forth in the following description and defined by the annexed claim.

In the drawings:

Figure 1 is a detached perspective side view of the completed spring unit alone.

Figure 2 is a perspective view showing the seat spring mounted on a cut off portion of a machine riser and with rider's seat adjustably attached to top arm of seat spring with small circular sector loop under the raised front portion of seat and shown by dotted lines.

Figure 3 is a perspective view of the seat spring with its lower arm attaching member shortened somewhat and extending downwardly to form also a riser or attaching standard with the latter turned at right angle at its bottom with slot and bolt for bolting to machine.

It will be understood that various changes and modifications may be made as to the detail of construction, sizes and arrangements of the parts without departing from the scope of claim.

In carrying out my invention I construct the seat spring shown in Figures 1, 2 and 3 preferably of one piece of flat spring steel and with both circular loop sections 2 and 3, on the upper side of both upper and lower arms of the spring and with the circular sector loop 2 of smaller diameter for greater compression resistance than the circular sector loop 3 to act as a fulcrum for the weight of the rider or to be adjusted to the weight of the rider, by sliding the seat 9 shown in Figure 2 backwards or forwards along the slotted boltway 4 shown in Figure 1, nearer or further away from circular sector loop 3 and to also act as a second graduated and greater compression resistance than contained in circular sector loop 3, when the latter under violent or heavy shock reaches the point of pounds resistance at which circular sector loop 2 begins its operative compression shown in dotted line 6 in Figure 1. The upper and lower horizontal arms 1 and 8 of seat spring shown in Figure 1 are both slotted, slot 4, Figure 1 for seat weight adjustment for rider and seat boltway to fasten seat 9, Figure 2 to top of seat arm 1, shown in Figure 1 and slot 5, Figures 1 and 2 for obtaining rider's position adjustment and to fasten the lower arm 8 of spring bolt 11 to the machine riser 10, shown in Figure 1 and slot 5.

Both upper and lower horizontal arms 1 and 8, Figure 1, and circular sector loops 2 and 3, Figures 1, 2 and 3 are united with a central diagonal compensating bar 7, Figures 1, 2 and 3. The riser as shown in Figure 3 if desired may be formed on the spring itself by extending its lower horizontal arm 8 downwardly forming extension riser standard 10, Figure 3, which is turned at right angle at bottom 12 for attaching portion with slot 5 and bolted to machine by bolt 11. This simplified form of seat spring and riser combined is preferred for short length risers as long or high risers or standards would require reinforcing same for strength and stiffness by having a specially rolled piece of steel thicker at bottom of riser 12, shown by dotted lines 13 and tapering therefrom gradually upwardly to point of merging into horizontal bottom arm 8 of seat spring proper before the operation of formation of the seat spring itself. This form of seat spring and riser combined is designed for manufacturers who desire the same for equipping one machine only and not as an interchangeable seat spring unit for equipping all types of riding machines.

The point of juncture between the compensating bar 7 and the lower and larger loop 3 is for distinction indicated by the numeral 14. This point affords the greatest resiliency to the seat support and permits of the compensating bar yielding under the pressure of weight to a far greater extent than can the arm 1 spring or yield from its point of juncture 15 with the upper and smaller loop 2. The result is that the arm 1 when under pressure of weight is sustained substantially parallel or horizontal with the arm 8.

The outwardly bulged portion of the bottom of the seat, that provides a division for the legs of the occupant of said seat, frequently termed the saddle, is for distinction indicated by the numeral 16. By reference to Figure 2 it will be seen that the loop 2 is arranged beneath and has its edges in contact with the side walls provided by the said saddle 16 and by this arrangement it will be seen that the seat 9 is always held longitudinally on the said arm 1 and cannot move laterally thereon.

The unit one piece seat spring built as shown in Figures 1, 2 and 3 when in action under compression and rider's weight works in vertical action and sustains the rider from shocks, without its several parts coming into contact, under either light or heavy duty. The seat spring adjusts to light or heavy weight rider by shifting seat 9, Figure 2, nearer or farther away from the larger circular sector loop 3 using the smaller circular sector loop 2 as fulcrum of greater resistance until the resistance pressure pounds of the larger circular sector loop 3 reaches the resistance pressure under which the smaller circular sector loop 2 begins its action as a second and heavier pressure resistance agent in absorbing heavier and violent shocks. In making both circular sector loops 2 and 3, Figure 1 of upwardly construction the lower attaching horizontal arm 8 is left unobstructed by loop interference in obtaining shifting position when attaching to riser 10, Figure 2.

For the several new, useful and efficient features obtained in the highly perfected and combined form of construction illustrated in Figures 1, 2 and 3 and fully described in the foregoing specifications I claim:

A weight compensating and shock absorbing support for the seats of agricultural implements comprising a flat spring member shaped to provide a lower horizontal arm and an oppositely directed upper horizontal arm, both arms having their ends, on their upper faces looped, a central diagonal compensating bar connected to the loops, the looped end of the upper arm being of a smaller diameter than that of the lower arm to offer a greater pressure resistance than the lower loop, both of said arms being slotted longitudinally, and the lower arm designed to be adjustably secured to a riser, a seat resting on the upper arm, a bolt member passing through the seat and through the slot in the upper arm and said bolt being engaged by a nut, said seat having its bottom formed with an upwardly bulged saddle, between whose sides the upper loop is received and with which sides the said loop contacts, and the adjustment of the seat on the upper arm compensating for the different weights of the occupants of the seat.

In testimony whereof I affix my signature.

DAVID M. DEARING.